(12) United States Patent
Bender et al.

(10) Patent No.: US 8,956,986 B2
(45) Date of Patent: Feb. 17, 2015

(54) BINDING FIBER FOR BONDING OF FLAT MATERIAL CONTAINING NATURAL FIBERS

(75) Inventors: Klaus Bender, Bonaduz (CH); Gunther Schäch, Chur (CH); Eberhard Kinkelin, Chur (CH)

(73) Assignee: EMS-Patent AG, Domat/Ems (CH)

( * ) Notice: Subject to any disclaimer, the term of this patent is extended or adjusted under 35 U.S.C. 154(b) by 298 days.

(21) Appl. No.: 12/928,732

(22) Filed: Dec. 17, 2010

(65) Prior Publication Data

US 2011/0146907 A1 Jun. 23, 2011

(30) Foreign Application Priority Data

Dec. 17, 2009 (EP) .................................. 09015622

(51) Int. Cl.
| | | |
|---|---|---|
| *D04H 5/00* | (2012.01) | |
| *C08G 69/36* | (2006.01) | |
| *C08L 77/02* | (2006.01) | |
| *C09J 177/02* | (2006.01) | |
| *D01F 6/80* | (2006.01) | |
| *D04H 1/52* | (2006.01) | |

(52) U.S. Cl.
CPC ................ *C08G 69/36* (2013.01); *C08L 77/02* (2013.01); *C09J 177/02* (2013.01); *D01F 6/80* (2013.01); *D04H 1/52* (2013.01)
USPC .......... 442/334; 442/335; 442/336; 442/337; 442/352; 428/365; 428/373; 428/374; 428/395; 525/436; 528/310

(58) Field of Classification Search
USPC .......... 428/365, 373, 374, 395; 525/310, 436; 442/334, 335, 336, 337, 652; 424/362, 424/364, 395; 528/310
See application file for complete search history.

(56) References Cited

U.S. PATENT DOCUMENTS

| | | | |
|---|---|---|---|
| 3,515,702 A | | 6/1970 | Raabe |
| 3,664,914 A | | 5/1972 | Kubitzek et al. |
| 3,883,485 A | | 5/1975 | Raabe et al. |
| 3,933,762 A | | 1/1976 | Naito et al. |
| 6,026,819 A | * | 2/2000 | Berger ..................... 131/332 |
| 2002/0022670 A1 | * | 2/2002 | Poessnecker et al. ......... 516/172 |
| 2003/0003299 A1 | * | 1/2003 | Johnson et al. ............... 428/364 |
| 2003/0171052 A1 | * | 9/2003 | Bansal et al. ................. 442/327 |

FOREIGN PATENT DOCUMENTS

| | | |
|---|---|---|
| DE | 1913246 | 10/1970 |
| DE | 3430467 | 2/1986 |
| DE | 297 20 598 | 3/1998 |
| DE | 102 00 559 | 8/2002 |
| DE | 102 47 413 | 4/2004 |
| DE | 10 2004 062 647 | 6/2006 |
| DE | 10 2004 062 649 | 7/2006 |
| EP | 0627454 | 12/1994 |
| EP | 1153957 | 11/2001 |
| JP | 406264354 A * | 9/1994 |
| JP | 2008 038260 | 2/2008 |
| WO | WO 2006/102975 | 10/2006 |

OTHER PUBLICATIONS

Ishikawa (Die Makromolekulare Chemie 1969 p. 123).*
Lyondell H5618.*

* cited by examiner

*Primary Examiner* — Gregory Listvoyb
(74) *Attorney, Agent, or Firm* — D. Peter Hochberg; Sean F. Mellino; Richard A. Wolf

(57) ABSTRACT

A binding fiber having, as at least one first thermoplastic component, a copolyamide which has a relative viscosity of at least 1.50 (measured at 0.5% in m-cresol at 25° C.), a MVR of maximum 20 cm$^3$/10 min at 190° C. and 2.16 kg load, a hydrophobicity of less than 7.2, a melting temperature lower than 105° C. in the water saturated condition and a higher melting temperature in the dry condition. The binding fiber can, on the one hand, be activated with hot steam at approximately ambient pressure during the manufacture of flat materials containing natural fibers, such as paper, cardboard, wood fiber boards, or fiber mats. The finished flat material can, on the other hand, be subjected to higher temperatures, and the copolyamide develops good bonding with respect to the cellulose fibers normally used in the indicated flat materials.

22 Claims, No Drawings

BINDING FIBER FOR BONDING OF FLAT MATERIAL CONTAINING NATURAL FIBERS

CROSS-REFERENCE TO RELATED APPLICATIONS

This application claims foreign priority based on European Patent Application No. 09015622.5, filed on Dec. 17, 2009, the content of which is incorporated herein by reference in its entirety.

BACKGROUND OF THE INVENTION

1. Field of the Invention

The present invention relates to a binding fiber for bonding of flat materials containing natural fibers with hot steam, where the natural fibers are in particular wood fibers or cellulose fibers and the flat materials are in particular paper, cardboard, nonwovens, fiber mats, or fiber boards.

2. Description of the Prior Art

From DT 19 13 246, the use of fibers described above as bonding fibers for binding of nonwovens from natural or synthetic nonwovens is known, wherein said nonwovens have a significantly lower melting point than the other fibers forming the nonwovens. The binding fibers are softened by temperature treatment and as a result are integrally bonded with the other fibers. DT 1913 246 furthermore proposes that bicomponent fibers are used as binding fibers, in particular in the core/sheath structure, wherein the core component polyamide 6 and the sheath component consists of a copolyamide from aminocaproic acid and amino undecanoic acid. In this instance, the bonding of the nonwovens is done at 130° C. and/or 135° C.

The use of bicomponent polyamide fibers, bicomponent polyester fibers, or other amorphous polyester adhesive fibers for bonding nonwovens containing natural fibers is known from DE 297 20 598 U1. These materials are believed to bond well with natural fibers with respect to polyolefins having greater polarity on a molecular basis, in particular with the cellulose molecules contained therein. In the case of bicomponent polyamide fibers, the core consists of polyamide 66 and the sheath of polyamide 6, or the core of polyamide 6 and the sheath of a copolyamide. For the bicomponent polyester fibers, bonding temperatures in the range from 100° C. to 205° C. are specified, with preferred values for the sheath higher than 140° C., particularly higher than 160° C. In the quoted example, the bonding is performed in a hot-air oven at a temperature of 182° C. It is said that bicomponent fibers can achieve a higher stability of the end product, using a crystalline sheath polymer compared to an amorphous sheath polymer. The sheath of the Unitika Fiber Melty 7080 that was selected as the example, consists of a semi-crystalline copolyester, for example. With respect to amorphous polyester bonding fibers of polyethylene terephthalate (PET) (e.g. Grilon KB of EMS-Chemie AG) it is said that they already become tacky above 70° C., due to their amorphous structure, but that this type of fiber starts crystallizing above 125° C., however, which results in achieving a PET melting point of 254° C. The bonding of such type of adhesive fiber must be performed under pressure, however.

Insulating boards from wood with densities of up to 300 kg/m$^3$ are known from DE 10 2004 062 647 A1 and DE 10 2004 062 649 A1, which are produced with thermoplastic binding fibers, preferably in combination with a granulated synthetic resin. The binding fibers and the granulated synthetic resin are softened and therefore activated in an oven at temperatures of 130° C.-200° C., in particular 160° C. to 185° C.

DE 102 00 559 A1 describes a sound-absorbing blanket made of natural raw material fibers like wood fibers to which had been added bicomponent binding fibers from polyester of the core/sheath type, wherein the core fiber consists of a polyester with a melting point above 160° C. and the sheath consists of a polyester where the melting point is in the range between 110° C. and 130° C. The fiber mixture formed into a mat with the so-called air-laid process is molded between two hot plates, where the hot plate has a temperature of 180° C. on the top side of the mat. The molding time is selected so that the binding fibers have time to react. In addition, the mat can be stabilized in an oven with hot air at a temperature of 180° C.

DE 34 30 467 A1 describes the manufacture of man-made boards from a mat of compressed material which is constructed of wood fibers and a curable bonding agent, such as a synthetic resin binder. The curing is done in a special press by means of steam. In this case, one makes use of the circumstance that the heat transfer with steam is more effective than in air, particularly during its condensation. On the other hand, a temperature that is significantly above 100° C. cannot be achieved without substantial expenditure and equipment, due to the excess pressure of the steam compared with the ambient pressure. A slight excess pressure results in DE 34 30 467 A1 by injecting the steam in the press into the mats of compressed material in order to overcome their resistance to flow. For work at higher temperatures, superheated steam is used. But synthetic resin binders based on acrylates are available that can be cured at temperatures below 100° C.

With methods of the type known from DE 34 30 467 A1, the bonding agent, such as described in DE 102 47 413 A1, is applied in liquid form by spraying onto wood fibers, for example. During the manufacture of compressed material mats, this application represents a separate process step and moreover also requires a relatively complex system, as can also be seen from DE 102 47 413 A1. This process step could be dispensed with when using binding fibers, since binding fibers can be easily mixed among the other fibers, and since a good and uniform mixture of the other fibers is required anyway. Furthermore, mixtures from binding fibers with additional fibers can be produced homogenously and do not have the tendency to segregate again during subsequent processing. Segregation is a distinct possibility, particularly when bonding agents of the granulated type are used, such as with DE 10 2004 062 647 A1 or DE 10 2004 062 649 A1.

For this reason, there is a requirement for binding fibers that can be used with the methods of the type known from DE 34 30 467 A1 and which can be activated with hot steam at approximately ambient pressure (i.e. including an excess pressure such as that occurring and/or required for example with DE 34 30 467 A1, if necessary). The binding fibers used in the above-mentioned prior art are not suitable for this purpose, since their activation temperature is too high.

Low-melting point copolyamides are known from EP 1 153 957 B1, which in one embodiment have a melting point of smaller than 90° C. (peak maximum) when measured according to DIN 53765. The melting point temperature is adjusted in that in addition to the normally used constituents caprolactam/ω-aminocaproic acid and laurolactam/ω-aminododecanoic acid, additional ω-amino-dicarboxylic acids and additional polyamide forming agents are combined in different quantity ratios. The copolyamides known from EP 1 153 957 B1 are specifically intended and suitable for use as hot-melt adhesives for textiles. On the other hand, because of their relatively low viscosity, they are not suitable for spinning, so that binding fibers of the required type cannot be produced with them.

SUMMARY OF THE PRESENT INVENTION

The object of the invention is therefore to provide a binding fiber which can be used for bonding of flat materials containing natural fibers, such as paper, cardboard, wood fiberboards, or fiber mats, while being activated with hot steam.

This problem is solved by the binding fiber in accordance with the presently claimed invention.

With the binding fiber as taught by the invention, the first thermoplastic component serves as the adhesive component. It includes a copolyamide. Because of its relative viscosity of at least 1.50 and an MVR of maximum 20 cm$^3$/10 min (at 190° C., 2.16 kg), it ensures that the material is suitable for melt spinning.

Then the copolyamide of the first thermoplastic component of the binding fiber as taught by the invention has a hydrophobicity smaller than 7.2. The hydrophobicity in this instance is defined as the ratio of alkyl groups ($CH_2$) to amino groups ($NH_2$ and/or NH) in monomers. The individual hydrophobicity values of the monomer constituents for the copolymer are added proportionately (according to mol-%). For polyamide 6 from caprolactam with 5 $CH_2$-groups and an $NH_2$ (and/or NH) group, a hydrophobicity value of 5.0 results, for example. For polyamide 12 from laurolactam, a hydrophobicity value of 11 results with 11 $CH_2$-groups and one $NH_2$ (and/or NH) group. For a copolyamide from 60 mol-% and/or 46% by weight caprolactam and 40 mol-% and/or 54% by weight laurolactam, a hydrophobicity value of 7.40 results, for example.

Because of its low hydrophobicity smaller than 7.2, the copolyamide of the first thermoplastic component of the binding fiber as taught by the invention is relatively hydrophilic and can therefore easily absorb water from a moist environment. The water absorption in turn produces a lowering of the melting point. In view of the present desired application of the binding fiber as taught by the invention with methods of the known type from DE 34 30 467 A1 is sufficient, for example, if the melting point under the prevailing conditions at the time, i.e. in a highly enriched atmosphere with hot steam at approximately ambient pressure, if said melting point is in a temperature range that can be attained with hot steam. With the binding fiber as taught by the invention, the melting point temperature of the copolyamide of the first thermoplastic component is below 105° C. in a water saturated condition.

The lowering of the melting temperature as a result of the water absorption on the other hand means that the melting temperature is higher in the dry condition. With the binding fiber as taught by the invention the copolyamide of the first thermoplastic component has a melting temperature higher than 105° C. in the dry condition. That is an additional advantage, because the flat materials can therefore be subjected to a higher temperature in a relatively dry environment of normal humidity. They have a higher heat distortion temperature.

As described, the relatively low hydrophobicity value of smaller than 7.2 can be achieved by a relatively large number of amino groups ($NH_2$ and/or NH) relative to the number of alkyl groups ($CH_2$) in the copolyamide. In addition, the large number of amino groups is also beneficial for the adhesive properties in the molten and/or softened condition of the copolyamide. The copolyamide of the first thermoplastic component of the binding fiber as taught by the invention develops particularly good bonding by forming hydrogen bonds across the many amino groups ($NH_2$ and/or NH) with respect to the cellulose fibers normally used in the specified flat materials. As a result, a good strength with such flat materials is already achieved with a low percentage of binder.

In summary, the present invention provides in its preferred form a material for the at least one thermoplastic component of the binding fiber for the use in methods of the type known from DE 34 30 467 A1, and copolyamides can be used with different advantages because in the dry condition they have a melting point above that of the activation temperature achieved or achievable with the method with the hot steam at approximately ambient pressure, but in the hot steam environment however they have a reduced melting or at least softening point below the achieved or achievable temperature.

The binding fiber can be activated with saturated or superheated steam or with a steam/air mixture or in an aqueous medium that can be evaporated through the input of energy.

Preferred embodiments of the invention can be found in the sub-claims.

DETAILED DESCRIPTION OF THE PRESENT INVENTION

Thereupon, in view of the spinnability through melt spinning it is preferred if the copolyamide that is used for the first thermoplastic component has a relative viscosity of at least 1.55, particularly preferred of at least 1.60 (measured as 0.5% in m-cresol at 25° C.) and an MVR of maximum 15 cm$^3$/10 min, particularly preferred of maximum 10 cm$^3$/10 min (measured at 190° C. and 2.16 kg load pursuant to ISO 1133).

In view of a significant lowering of their melting point in a moist environment, the copolyamide used for the first thermoplastic component should have a hydrophobicity of less than 7.0, and particularly preferred less than 6.8.

In order to be able to activate the fiber as taught by the invention with hot steam at approximately ambient pressure, the copolyamide used for the first thermoplastic component should have a melting temperature in a water saturated condition that is preferably lower than 100° C. Conversely, it is preferred if the copolyamide has a melting temperature above 110° C. in the dry condition.

The copolyamide used for the first thermoplastic component has the following composition:
  caprolactam 40-70 mol-%;
  laurolactam, and/or 12-aminododecanoic acid, 20-50 mol-%;
  aminoundecanoic acid, 0-10 mol-%;
  at least one dicarboxylic acid 10-30 mol-% of the following compounds:
    aliphatic α,ω-dicarboxylic acids with 4 to 14 C atoms,
    aromatic dicarboxylic acids such as terephthalic acid, isophthalic acid and 2,6-naphthalene dicarboxylic acid, where the percentage of aromatic dicarboxylic acids is smaller than 15 mol-% relative to the total quantity of all dicarboxylic acids
  to the dicarboxylic acids, an equimolar quantity of one or several diamines, such as hexamethylene diamine, piperazine, two-methyl-1,5-diaminopentane or other aliphatic long-chain diamines, where the molar percentage of hexamethylene diamine, relative to the diamines mixture, is between 50 and 100 mol-%.

With the above specification, the sum of all lactames, all amino acids and all dicarboxylic acids, is 100 mol-%. This corresponds to a definition in which the copolyamide molecule chain of the repetitive units all result in 100 mol-%. With such repetitive units, which are respectively composed of one dicarboxylic acid and one diamine as a complementary monomer pair, in principle one dicarboxylic acid and one diamine are provided as a half repetitive unit in each case. However one can, which from a mathematical point of view is identical, either count the dicarboxylic acids (as in the above case) or the diamines (substitutional for the whole repetitive unit, as done above), in which case the complementary monomers (in the above case, the diamines) are present in equimolar quantity (in the above case to the dicarboxylic acids).

For the applications currently under discussion, the binding fiber is preferably a bicomponent fiber with a further thermoplastic component, namely further preferably of the core/sheath type. With the further thermoplastic component, this should involve such type that has a melting temperature above 130° C. in the water saturated condition, and preferably at least 150° C. in the dry condition. The second thermoplastic component will thereby not melt in the applications currently under discussion, and it makes a positive contribution to the strength of the final product.

The further thermoplastic component can be a polyolefin, a polyamide, a copolyamide, a polyester, or a copolyester.

In particular, the further thermoplastic component is selected from the group:

polypropylene and its derivatives with MVR 20-50 cm$^3$/10 min (230° C., 2.16 kg)

polyethylene (preferably HDPE) and its derivatives with MVR 10-30 cm$^3$/10 min (190° C., 2.16 kg)

PA 6 with MVR 40-80 cm$^3$/10 min (260° C., 2.16 kg)

PA 6/66 with a melting point 180-220° C. and MVR 40-80 cm$^3$/10 min (260° C., 2.16 kg)

copolyamide with a melting point 150-180° C. and MVR 5-15 cm$^3$/10 min (190° C., 2.16 kg)

PBT with MVR 40-80 cm$^3$/10 min (260° C., 2.16 kg)

copolyester with a melting point 150-180° C. and MVR 5-15 cm$^3$/10 min (190° C., 2.16 kg).

The specified melting point ranges refer to the dry condition. The viscosity (expressed indirectly by the MVR) of the further thermoplastic component should be high enough so that the ability of melt spinning is ensured, however low enough so that the extrusion temperature is not more than 60° C. above the extrusion temperature of the copolyamide of the first thermoplastic component. In this way, the bicomponent fiber can be produced at an optimum spinning temperature, which results in a uniform core/sheath distribution and a non-tacky fiber product.

Furthermore, the binding fiber preferably is a staple fiber with a diameter of 8-80 μm, preferably 10-30 μm, and a length of 2-30 mm, preferably 4-12 mm.

Ultimately, the binding fiber can be provided with a preparation on its surface which is adapted to the application and which ensures the separation of the fiber during the air-laid process and/or the dispersibility during the wet-laid process.

The binding fiber as taught by the invention is used for bonding of flat materials containing natural fibers (into which the binding fiber was mixed), where the natural fibers are in particular wood fibers or cellulose fibers and the flat materials are in particular paper, cardboard, nonwovens, fiber mats, or fiber boards (in particular wood fiber boards). Since the binding fiber can be activated with hot steam, bonding can occur at approximately ambient pressure (roughly standard pressure) in a steam atmosphere or in an atmosphere containing steam. In this instance, it is particularly preferred if the bonding is performed at a temperature of <125° C. in a steam/air mixture with a dewpoint <100° C. In another preferred variant, bonding occurs through contact drying or convection drying of the moist flat material.

EXAMPLES

In order to investigate and to compare their melting and adhesion characteristics, two bicomponent fibers of the core/sheath type were produced each with one copolyamide sheath, as Sample A and B.

Table I lists the composition of the copolyamides of the two samples, including the proportion of the individual monomers in mol-%, their hydrophobicity, their relative viscosity, their MVR, and their melting point measured under dry conditions. In each case, polypropylene was used as the core of both fibers, where a melting point of 168° C. was measured likewise under dry conditions.

TABLE I

| Monomers (mol-%)* | Sample A | Sample B |
|---|---|---|
| Composition | Semi-crystalline CoPA, consisting of caprolactam, laurolactam and other aromatic and aliphatic dicarboxylic acids and diamines as follows: | Semi-crystalline CoPA, consisting of caprolactam, laurolactam and other aromatic and aliphatic dicarboxylic acids and diamines as follows: |
| Caprolactam | 54 | 27 |
| Laurolactam | 29 | 43 |
| Adipic acid | 17 | 15 |
| Sebacic acid |  | 15 |
| Hexamethylene diamine | 17 | 30 |
| Hydrophobicity | 6.5 | 7.5 |
| Relative viscosity (0.5% in m-cresol at 25° C.) | 1.65 | 1.55 |
| MVR [cm$^3$/10 min] (190° C., 2.16 kg) | 8 | 42 |
| Melting point (dry) [° C.] | 113 | 87 |

*The sum of all lactames, amino acids (if present) and all dicarboxylic acids (or the equimolar quantity of diamine) results in 100 mol-% in each case.

As already discussed previously, the hydrophobicity values represent the ratio of the number of alkyl groups (CH$_2$) to the number of amino groups (NH$_2$ and/or NH) in the monomers. The hydrophobicity values of the individual monomers were then added up for the copolyamides according to the mol-%. The relative viscosity values were then measured at 0.5% in m-cresol at 25° C. (i.e. 0.5 g CoPA in 100 ml solution). The MVR values were determined pursuant to ISO 1133 at 190° C. and a load of 2.16 kg. The melting points were determined pursuant to DIN 53765 in the dry condition and/or in a dry environment, where the copolyamide was dried before melting.

Sample A which represents the binding fiber according to the present invention has a melting point of 113° C. in the dry condition, while Sample B has a melting point of 87° C. in the dry condition. Sample B therefore does not represent the binding fiber according to the present invention.

The two Samples A and B were used for the bonding of wood fibers, where the activation was performed in a steam atmosphere at a dewpoint of 95° C. As a comparison, the activation was performed at the same temperature directly in water. In each case, the melting rate of the samples as well as their adhesiveness to the wooden fibers (adhesive matrix) were assessed. Table II shows the result:

TABLE II

| Environment | Properties | Sample A | Sample B |
|---|---|---|---|
| Steam 95° C. | Melting rate | visible | visible |
| | Adhesive matrix | good | satisfactory |
| Water bath 95° C. | Melting rate | distinct | distinct |
| | Adhesive matrix | very good | good |

Table II shows that with respect to both samples that although the results (which cannot be used in practice) in the water bath are better than in steam, although steam also achieves sufficiently good results for the melting rate and the adhesiveness. For this purpose, the sample A as taught by the invention is surprisingly superior to the reference sample B, despite its higher melting point of significantly higher than 100° C. (in the dry condition), where it was actually expected that better adhesive behavior would be obtained because of its lower melting point of 87° C. (in the dry condition).

This result is also advantageous to the extent that when using the material of Sample A, which moreover was produced with even more price competitive monomers, the finished flat material can be subjected to a higher temperature in the dry condition and also has higher breaking strength by approximately 50%-100% (Table III).

TABLE III breaking strength of wood fiber mats
(bonding with steam/air mixture)

| Thermofusion | Bicomponent fiber % | Wood fiber % | Sample A | Sample B |
|---|---|---|---|---|
| Steam/air Dewpt.: 95° C. | 4% | 96% | 15 kPa | 8 kPa |
| Steam/air Dewpt. 95° C. | 10% | 90% | 30 kPa | 20 kPa |

In order to compare Sample A with other materials, two additional adhesive fibers were produced from copolyester, i.e. Sample C and/or Sample D. Table IV lists the characteristics of these two copolyesters. The copolyester of Sample C is semi-crystalline and the copolyester of Sample D is amorphous. For this reason, merely a melting point of 120° C. was stated for Sample C, wherein this again applies for the dry condition. For logical reasons, hydrophobicity can not be stated for copolyesters, since they do not contain any amino groups.

TABLE IV

| | Sample C | Sample D |
|---|---|---|
| Composition | Semi-crystalline CoPES, consisting of aromatic and aliphatic dicarboxylic acids and Diolen | Amorphous CoPES, consisting of aromatic and aliphatic dicarboxylic acids and Diolen |
| Relative viscosity (1% in m-cresol) | 2.04 | 1.66 |
| MVR [cm³/10 min] (190° C., 2.16 kg) | 19 | 5.6 |
| Melting point [° C.] | 120 | — |
| Glass transition temperature. [° C.] | 7 | 69 |
| Water absorption (23° C./100% RH.) | <0.5% | <0.5% |

Table V shows the results of experiments with Samples A, C, and D, again with respect to their melting rate and their adhesiveness (adhesive matrix) at different temperatures in steam and in the water bath (partially at excess pressure).

TABLE V

| Environment. | ° C. | Properties | Sample A | Sample C | Sample D |
|---|---|---|---|---|---|
| Water bath | 95 | Melting rate | distinct | visible | not visible |
| | | Adhesive matrix | very good | none | none |
| | 105 | Melting rate | distinct | visible | not visible |
| | | Adhesive matrix | very good | none | none |
| | 115 | Melting rate | distinct | distinct | visible |
| | | Adhesive matrix | very good | good | none |
| | 125 | Melting rate | distinct | distinct | visible |
| | | Adhesive matrix | very good | good | none |
| Water - steam | 95 | Melting rate | visible | not visible | not visible |
| | | Adhesive matrix | good | none | none |
| | 105 | Melting rate | distinct | not visible | not visible |
| | | Adhesive matrix | very good | none | none |

According to these results, both copolyesters of Samples C and D do not exhibit a comparable drop in the melting point in relation to the copolyamide as taught by the invention, and cannot be activated with hot steam.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A binding fiber for bonding of flat materials containing natural fibers through activation of the binding fiber by heat in a water saturated condition, wherein said binding fiber is a bicomponent fiber of the core/sheath type, wherein the sheath is made from a copolyamide as a first thermoplastic component with the following composition:
   caprolactam 40-70 mol-%;
   laurolactam, and/or 12-aminododecanoic acid, 20-50 mol-%;
   aminoundecanoic acid, 0-10 mol-%;
   at least one dicarboxylic acid 10-30 mol-% selected from the group of compounds consisting of:
      aliphatic α,ω-dicarboxylic acids with 4 to 14 C atoms;
      aromatic dicarboxylic acids such as terephthalic acid, isophthalic acid and 2,6-naphthalene dicarboxylic acid, where the percentage of aromatic dicarboxylic acids is smaller than 15 mol-% relative to the total quantity of all dicarboxylic acids;
      with respect to the at least one dicarboxylic acid, an equimolar quantity of at least one diamine selected from the group consisting of hexamethylene diamine, piperazine, 2-methyl-1,5-diaminopentane and other aliphatic long-chain diamines, wherein the molar percentage of hexamethylene diamine, relative to the diamine mixture, is between 50 and 100 mol-%;
   wherein the sum of all lactames, all amino acids and all dicarboxylic acids is 100 mol-%;
   wherein the copolyamide has a relative viscosity of at least 1.50 when measured at 0.5% in m-cresol at 25° C., an MVR of maximum 20 cm³/10 min. when measured at 190° C. and 2.16 kg load, a hydrophobicity having a ratio of alkyl groups to amino groups in the monomers of smaller than 7.2, and has a melting point temperature of less than 105° C. in the water saturated condition and a higher melting point temperature in the dry condition; and wherein the core is made from a further thermoplastic component having a melting temperature above 130° C. in the water saturated condition and a melting temperature of at least 150° C. in the dry condition.

2. The binding fiber according to claim 1, wherein the copolyamide of the at least one first thermoplastic component has a relative viscosity of at least 1.55 when measured at 0.5% in m-cresol at 25° C.

3. The binding fiber according to claim 2, wherein the copolyamide of the at least one first thermoplastic component has a relative viscosity of at least 1.60 when measured at 0.5% in m-cresol at 25° C.

4. The binding fiber according to claim 1, wherein the copolyamide of the at least one first thermoplastic component has an MVR of 15 cm$^3$/10 min maximum when measured at 190° C. and 2.16 kg load.

5. The binding fiber according to claim 4, wherein the copolyamide of the at least one first thermoplastic component has an MVR of 10 cm$^3$/10 min. maximum when measured at 190° C. and 2.16 kg load.

6. The binding fiber according to claim 1, wherein the copolyamide of the at least one first thermoplastic component has a hydrophobicity less than 7.0.

7. The binding fiber according to claim 6, wherein the copolyamide of the at least one first thermoplastic component has a hydrophobicity less than 6.8.

8. The binding fiber according to claim 1, wherein the copolyamide of the at least one first thermoplastic component has a melting point temperature lower than 100° C. in the water saturated condition.

9. The binding fiber according to claim 1, wherein the copolyamide of the at least one first thermoplastic component has a melting point temperature higher than 110° C. in the dry condition.

10. The binding fiber according to claim 1, wherein the further thermoplastic component is selected from the group consisting of a polyolefin, a polyamide, a copolyamide, a polyester, and a copolyester.

11. The binding fiber according to claim 10, wherein the further thermoplastic component is selected from the group consisting of:
    polypropylene and its derivatives with MVR 20-50 cm$^3$/10 min. at 230° C., and 2.16 kg;
    polyethylene and its derivatives with MVR 10-30 cm$^3$/10 min. at 190° C., and 2.16 kg;
    PA 6 with MVR 40-80 cm$^3$/10 min. at 260° C., and 2.16 kg;
    PA 6/66 with a melting point 180-220° C. and MVR 40-80 cm$^3$/10 min at 260° C., and 2.16 kg;
    copolyamide with a melting point 150-180° C. and MVR 5-15 cm$^3$/10 min at 190° C., and 2.16 kg;
    PBT with MVR 40-80 cm$^3$/10 min. at 260° C., and 2.16 kg; and
    copolyester with a melting point 150-180° C. and MVR 5-15 cm$^3$/10 min. at 190° C., and 2.16 kg).

12. The binding fiber according to claim 11, wherein said polyethylene is HDPE.

13. The binding fiber according to claim 1, wherein said binding fiber is a staple fiber with a diameter of 8-80 μm and a length of 2-30 mm.

14. The binding fiber according to claim 1, wherein said binding fiber is a staple fiber with a diameter of 10-30 μm, and a length of 4-12 mm.

15. The binding fiber according to claim 1, wherein said binding fiber further comprises a preparation for ensuring the defibration of the fiber during an air-laid process and/or the dispersibility during a wet-laid process.

16. The binding fiber according to claim 1, wherein the composition of the copolyamide of the first thermoplastic component comprises just one dicarboxylic acid.

17. A binding fiber for bonding of flat materials containing natural fibers through activation of the binding fiber by heat in a water saturated condition, wherein said binding fiber is a bicomponent fiber of the core/sheath type, wherein the sheath is made from a copolyamide as a first thermoplastic component, said copolyamide composition comprising:
    caprolactam 40-70 mol-%;
    laurolactam, and/or 12-aminododecanoic acid, 20-50 mol-%;
    aminoundecanoic acid, 0-10 mol-%; and
    further consisting of one dicarboxylic acid 10-30 mol-% selected from the group of compounds consisting of:
        aliphatic α,ω-dicarboxylic acids with 4 to 14 C atoms;
        aromatic dicarboxylic acids, where the percentage of aromatic dicarboxylic acids is smaller than 15 mol-% relative to the total quantity of all dicarboxylic acids;
    wherein said copolyamide composition further comprises, with respect to the one dicarboxylic acid, an equimolar quantity of at least one diamine selected from the group consisting of hexamethylene diamine, piperazine, 2-methyl-1,5-diaminopentane and other aliphatic long-chain diamines, wherein the molar percentage of hexamethylene diamine, relative to the diamine mixture, is between 50 and 100 mol-%;
    wherein the sum of all lactames, all amino acids and all dicarboxylic acids is 100 mol-%;
    wherein the copolyamide has a relative viscosity of at least 1.50 when measured at 0.5% in m-cresol at 25° C., an MVR of maximum 20 cm$^3$/10 min. when measured at 190° C. and 2.16 kg load, a hydrophobicity having a ratio of alkyl groups to amino groups in the monomers of smaller than 7.2, and has a melting point temperature of less than 105° C. in the water saturated condition and a higher melting point temperature in the dry condition; and
    wherein the core is made from a second thermoplastic component having a melting temperature above 130° C. in the water saturated condition and a melting temperature of at least 150° C. in the dry condition;
    wherein, when the binding fiber for bonding of flat materials containing natural fibers is subjected to a temperature greater than the melting temperature of the copolyamide sheath of the first thermoplastic component and less than the melting temperature of the core of the second thermoplastic component, the copolyamide sheath melts for enabling bonding with the natural fibers of the flat material, and the thermoplastic core does not melt for enabling improved strength of the bonded flat material.

18. A method for bonding of flat materials containing natural fibers, wherein the flat materials are selected from the group consisting of paper, cardboard, nonwovens, fiber mats, and fiber boards, and wherein the method comprises the steps of:
    providing the natural fibers selected from the group consisting of wood fibers and cellulose fibers'
    providing binding fibers according to claim 1;
    mixing the binding fibers into the natural fibers for obtaining a mixture of the binding fibers and the natural fibers;
    forming said mixture into a flat material; and bonding said flat material in a steam or steam-containing atmosphere at approximately ambient pressure.

19. The method according to claim 18, wherein said bonding step is carried out at a temperature <125° C. in a steam/air mixture with a dewpoint <100° C.

20. The method according to claim 18, further comprising the steps of:
   forming the mixture with the activated binding fibers into a moist flat material; and
   drying the moist flat material by contact drying or convection drying.

21. The binding fiber according to claim 17, wherein the aromatic dicarboxylic acid is selected from the group consisting of terephthalic acid, isophthalic acid, and 2,6-naphthalene dicarboxylic acid.

22. The binding fiber according to claim 1, wherein the copolyamide composition of the first thermoplastic component has an amount of caprolactam in the range of 54-70 mol-%.

* * * * *